United States Patent
Bauer et al.

(10) Patent No.: US 7,509,704 B2
(45) Date of Patent: Mar. 31, 2009

(54) WIPER BLADE

(75) Inventors: Peter-Josef Bauer, Birhlertal (DE); Christian Wilms, Koersel-Beringen (BE); Hubert Verelst, Tienen (BE); Joris Grammens, Linter (BE); Tom Vangeel, Herk-de-Stad (BE)

(73) Assignee: Robert Bosch GmbH (DE)

( * ) Notice: Subject to any disclaimer, the term of this patent is extended or adjusted under 35 U.S.C. 154(b) by 780 days.

(21) Appl. No.: 10/508,231

(22) PCT Filed: Apr. 11, 2003

(86) PCT No.: PCT/DE03/01232

§ 371 (c)(1),
(2), (4) Date: Sep. 20, 2004

(87) PCT Pub. No.: WO03/091078

PCT Pub. Date: Nov. 6, 2003

(65) Prior Publication Data

US 2005/0138751 A1    Jun. 30, 2005

(30) Foreign Application Priority Data

Apr. 23, 2002    (DE) ............................... 102 18 033

(51) Int. Cl.
B60S 1/34    (2006.01)
(52) U.S. Cl. .................. 15/250.31; 15/250.32
(58) Field of Classification Search ............. 15/250.31, 15/250.3, 250.32, 250.201, 250.43, 250.351, 15/250.44
See application file for complete search history.

(56) References Cited

U.S. PATENT DOCUMENTS

| 4,442,566 | A | | 4/1984 | Sharp | |
|---|---|---|---|---|---|
| 5,325,561 | A | * | 7/1994 | Kotlar | 15/250.06 |
| 5,327,615 | A | * | 7/1994 | Green | 15/250.4 |
| 6,038,730 | A | * | 3/2000 | Chen | 15/250.452 |
| 6,820,302 | B2 | * | 11/2004 | Zimmer | 15/250.32 |
| 7,228,588 | B2 | * | 6/2007 | Kraemer et al. | 15/250.201 |
| 2005/0138751 | A1 | * | 6/2005 | Bauer et al. | 15/250.31 |
| 2007/0261192 | A1 | * | 11/2007 | Butcher et al. | 15/250.31 |

FOREIGN PATENT DOCUMENTS

| DE | 37 44 237 A1 | 7/1989 |
|---|---|---|
| DE | 38 29 343 A1 | 3/1990 |
| DE | 196 47 347 A1 | 5/1998 |
| DE | 197 31 683 A2 | 1/1999 |
| DE | 197 38 232 A1 | 3/1999 |
| GB | 2 036 547 | 7/1980 |

* cited by examiner

*Primary Examiner*—Lee D Wilson
(74) *Attorney, Agent, or Firm*—Michael Best & Friedrich LLP

(57) ABSTRACT

The invention starts from a wiper blade (20) of a windshield wiper with a wiper strip support (22) and wiper strip (24), which feature end caps (28) on their ends, whose inner cross-sectional profile is adapted to the cross-sectional profile of the wiper strip support (22). It is proposed that a guide rib (42, 48, 50) running transverse to the longitudinal direction (58) of the wiper blade (20) and having a guide surface (44, 54) be formed laterally on at least one of the end caps (28).

20 Claims, 4 Drawing Sheets

WIPER BLADE

BACKGROUND OF THE INVENTION

Known windshield wipers have a wiper arm constructed of a fastening part and an articulated part, which is connected to the fastening part in an articulated manner and has a wiper rod. Connected to the free end of the wiper rod in an articulated manner is a wiper blade constructed of a wiper strip and a wiper strip support, as a rule a supporting bracket system with a center bracket and, if necessary, subordinate brackets, e.g., an intermediate bracket and/or claw brackets, which hold the wiper strip. The brackets are also connected to the subordinate brackets in an articulated manner so that the wiper strip can adapt to the curvature of the vehicle window during the rotating movement. These types of windshield wipers are known from DE 37 44 237 A1, for example. The joints between the brackets are formed as a rule by plastic parts, which simultaneously cover the front side of the profile of the higher-order bracket.

In addition, a wiper strip support in the form of a supporting element made of an elastic high-strength plastic for a wiper strip is known from DE 197 38 232 A1, which has a curvature in an unloaded state that is designed so that uniform application force is produced when the wiper strip is applied completely to the vehicle window during operation of the wiper blade. In addition, similar wiper blades with a supporting element are known in which pre-bent spring rails are laterally inserted into a plastic profile. Caps made of plastic are mounted on the front sides as a conclusion of the profile. Both a supporting bracket system as well as a supporting element in the sense described above shall be understood in the following as a wiper strip support.

Wiper blades frequently tend to vibrate during the wiping process. During the rotating movement, the speed with which the wiper blade glides over the windshield continuously increases from the inner radius towards the outer radius. The frictional forces acting transverse to the longitudinal direction of the wiper blade, which are a function of the gliding speed, decrease with increasing glide speed so that a torque is produced around the vertical axis of the wiper blade, which changes its direction in the reverse positions. This changing torque stresses the bearing position between the wiper arm and the wiper blade. Above all with relatively long wiper blades, the guidance on the joint between the wiper blade and the wiper arm is not sufficiently stable to inhibit vibrations. The wiper blade is incited to vibrate since a wiper blade is a slim, elastic component and because of great speed differences in the frictional conditions between the drive-side inner area and the outer area of the wiper blade as well as due to the stick-slip effects. This leads, particularly on the inner circle of the wiper blade where especially low friction speeds are predominant, to undesired lateral movements, which starting at a certain size can lead to the wiper blade impacting the wiper arm and causing clattering noises. This is particularly critical if the vehicle windows are dry, dirty, icy, or not moist enough or there is snow on the vehicle window. Because the wiper blade can briefly lose contact with the vehicle window in this case, the wiped image is also unsatisfactory. The more bracket parts the wiper blade has, the sooner it tends to rattle. In addition, light wiper blades with low spring rigidity are less favorable than others.

In addition, a device to guide the wiper blade, which has a first and a second part, is known from DE 197 31 683 A1. It is arranged in the area of the coupling location of the claw bracket and permanently connected to the articulated part of the wiper arm, e.g., via adhesion, welding, soldering, clipping, clamping, etc. The first part of the device has guide cheeks, which grip around the articulated location of the claw bracket and guide laterally with respect to the wiper arm. The second part also has guide cheeks, between which the first part is guided in a telescoping manner so that its guide cheeks can be held briefly and a collision with the vehicle window need not be feared even when the vehicle window has strong curvatures. The first part is appropriately connected with the device so that it is secure from loss, for example, via a flexible element.

The device can be manufactured and composed of individual sheet metal parts, but it is preferably a plastic injection molded part made of a suitable plastic. In any case, additional components are required to guide the wiper blade, whereby increased expenditures for fabrication and assembly, and additional material costs are incurred. Air gaps are provided as a rule between the guide surfaces of the device in order to prevent the joint between the wiper blade and the wiper arm from jamming due to wiper-arm geometry that is influenced by tolerances such as right angles on the wiper rod. Clattering noise can also occur in this case, because, though the lateral vibrations are highly diminished, they are not avoided completely.

SUMMARY OF THE INVENTION

According to the invention, a guide rib running transverse to the longitudinal direction of the wiper blade and having a guide surface is formed laterally on at least one of the end caps. An additional component is not required to guide the wiper blade since the guide rib, which represents a part of a device to guide the wiper blade, forms one component with the end cap. The manufacturing expense and assembly expense are advantageously reduced as a result. The end cap can be guided with the guide rib directly or with the use of a guide bracket in the profile of the wiper arm, into which the end of the wiper blade pointing to the windshield wiper drive dips. As a rule, it is only necessary for one of the two end caps of the wiper blade to feature a guide rib. However, in order to avoid assembly errors, it is expedient to place the same end cap with a guide rib on both ends.

The guide bracket is preferably a plastic part and is inserted into the articulated part, for example, clipped in. As a result, it can also be mounted simply and with low expense. In addition, it can also improve the gliding properties between the end cap and the wiper arm and make a more favorable guidance profile possible than the inner profile of the wiper arm. Another advantage of the wiper blade guidance is that it is covered by the wiper arm to a large extent, does not require any additional installation space, and also makes a compact design of the windshield wiper possible in the wiper arm and wiper blade area. A compact windshield wiper produces less wind noise and possesses a better design.

The guide bracket features an outer profile adapted to the inner dimensions of the articulated part. It is supported on the inner contour of the articulated part. In order to lengthen the guide surfaces, a portion of the guide bracket can project beyond a side wall, which, in the area of the dipping end cap, serves as a bearing surface for the guide surface of the guide rib. Because of the inserted guide bracket, the articulated part is only lengthened in one area required for wiper blade guidance and otherwise remains unchanged. Analogous to the guide bracket, the shape of the guide rib is also adapted to the profile of the articulated part. If the articulated part has a U-shaped cross-sectional profile, for example, the allocated end cap can have formed-on guide ribs on both sides, whose guide surfaces run approximately rectangular to the base surface of the end caps and are guided onto the side walls of the U-profile with a slight amount of play. Because of the two-sided arrangement, the wiper blade can be guided in both wiping directions.

In one embodiment of the invention, the end cap features a guide rib formed on one side with angle of inclination to the base surface of the end cap, which is slightly less than 90°. This end cap shall be assigned to a wiper arm with a roof-like cross-sectional profile, whereby the guide rib is guided onto a side wall whose inclination is adapted to the shape of the guide rib. If the end cap dips into the wiper arm, the guide rib is positioned on the side wall of the wiper arm or the guide bracket, whereby the wiper blade is slightly pre-stressed transverse to its longitudinal direction. Because of the pre-stress there is advantageous contact between the guide rib and the guide bracket in every case since manufacturing tolerances and wear of the individual components are balanced out. In addition, the end cap also does not lose contact with the wiper arm because of the pre-stress even if the guide rib lies in the wiping direction in front of the wiper blade during a wiping movement. However, the guide rib is expediently arranged in such a way that, in the wiping direction that requires the greatest propelling force, it lies in the wiping direction behind the wiper blade.

The wiper blade is guided on the critical inner circle of the wiper field so that vibrations are avoided and the profile of the articulated part of the wiper arm can be used as a bearing surface. In addition, the joint between the wiper arm and wiper blade is relieved since the torque around the vertical axis of the wiper blade is supported on a wide basis because of the lateral guidance on the inner circle.

BRIEF DESCRIPTION OF THE DRAWINGS

Additional advantages are yielded from the following description of the drawings. Exemplary embodiments of the invention are depicted in the drawings. The drawings, the description, and the claims contain numerous features in combination. The expert will also observe individual features expediently and combine them into additional, meaningful combinations.

The drawings show.

DETAILED DESCRIPTION

Figure 1:
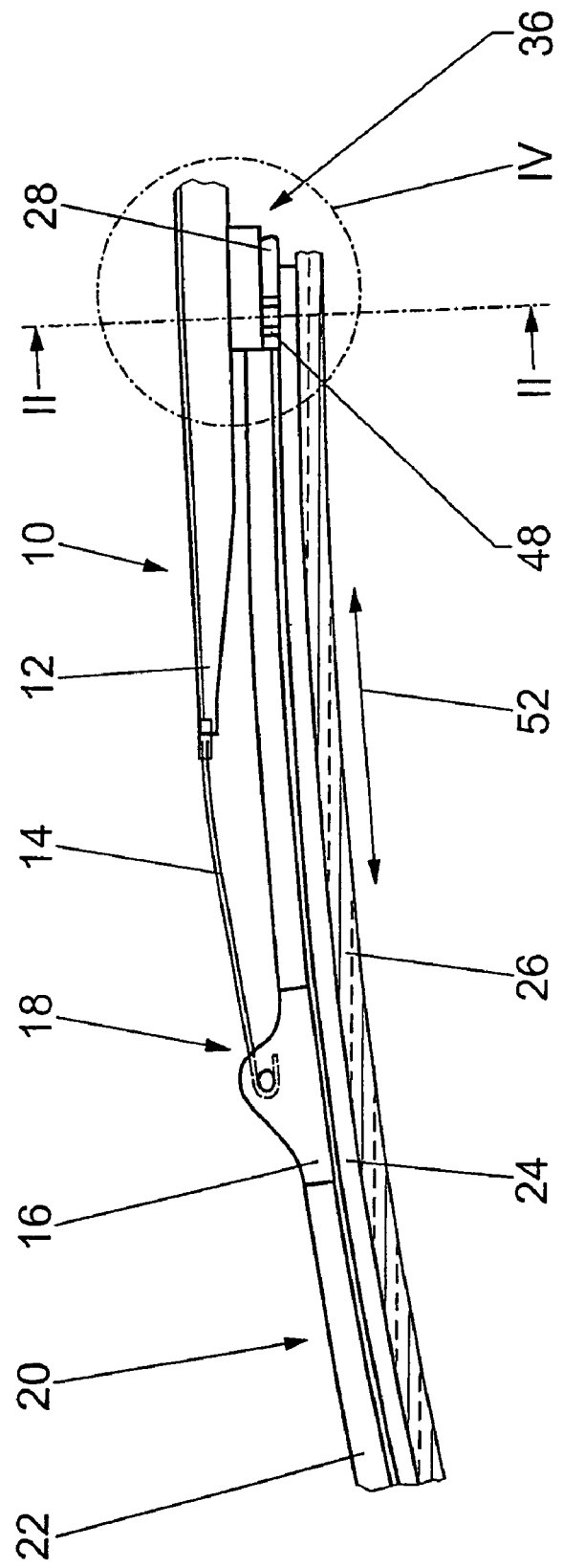
FIG. 1 A schematic side view of a wiper arm with a wiper blade that is connected in an articulated manner.

A wiper arm 10 constructed of an articulated part 12 and a wiper rod 14 is connected to a wiper blade 20 via a joint 18 and a connecting piece 16 (FIG. 1). The wiper blade 20 has an elastic, non-articulated wiper strip support 22, which is embodied as a spoiler and bears a wiper strip 24. The joint 18 between the wiper rod 14 and the wiper blade 20, and the elasticity of the wiper strip support 22 make it possible for the wiper strip 24 to be able to adapt to the curvature of a windshield 26 during the wiping movement. In doing so, the wiper blade 20 moves in a plane vertical to the windshield 26 relative to the wiper arm 10, whereby the relative stroke movement on the end of the wiper blade 20 is especially great.

Figure 2:
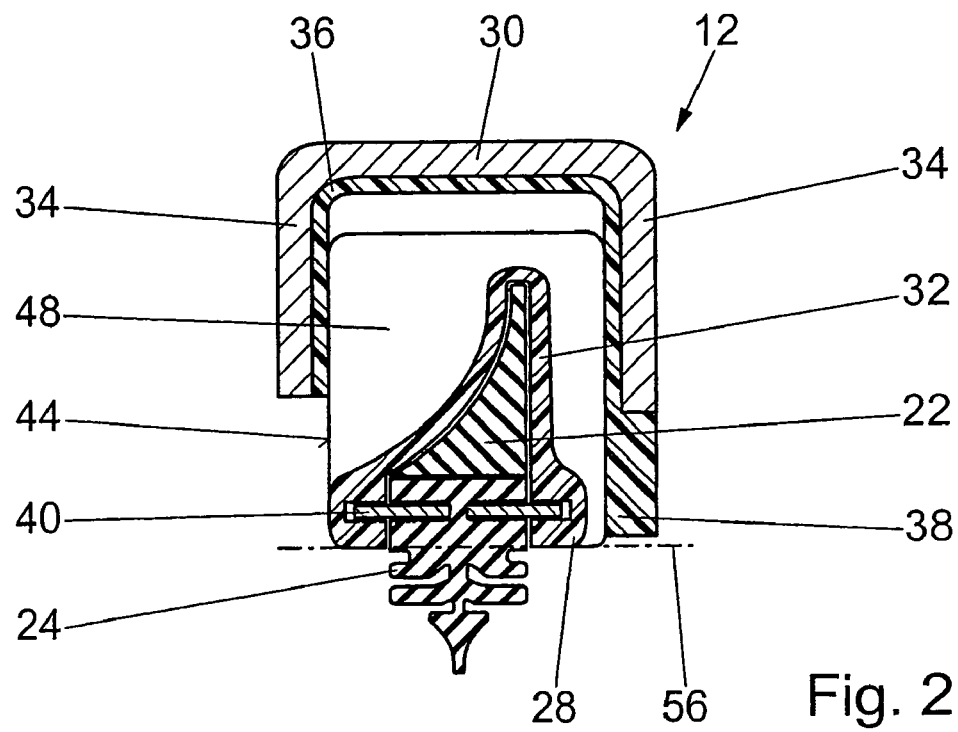
FIG. 2 A section corresponding to Line II-II in FIG. 1.

A wiper blade guide is provided for lateral guidance of the wiper blade 20 on the end facing the wiper arm 10. It is composed of an end cap 28 with laterally formed-on guide ribs 48, which run transverse to the longitudinal direction 58 of the wiper blade 20, and of the articulated part 12 with an inserted guide bracket 36, which serves as a bearing surface for the guide ribs 48. The end cap 28 made of plastic encircles the wiper strip support 22 and a portion of the wiper strip 24 together with two spring rails 40 made of spring steel, which are inserted into lateral longitudinal grooves of the profile (FIG. 2). It forms a covering for the wiper blade 20 in the end area and simultaneously fastens the spring rails 40 axially and together with the connecting piece 16. The guide ribs 48 are formed onto the end cap during manufacturing. They have lateral guide surfaces 44, which run vertical to a base surface 56 of the end cap 28 and in an assembled state in the profile of the wiper arm 10, e.g., when using a guide bracket 36, are guided on the two side walls 34 of the articulated part 12. In the embodiment according to FIG. 2, the articulated part 12 has a U-shaped cross-sectional profile. The guide bracket 36 is also a plastic part. It lines the inner contour of the articulated part 12 in the area of the end cap 28 and is supported on the side walls 34 and on the covering wall 30.

In one embodiment of the invention, guide ribs 42 or 50 with guide surfaces 44 or 54 are formed on only one side part 32 of the end cap 28 (FIG. 3 through FIG. 6). In addition, the guide surfaces 44 feature an angle of inclination a to the base surface 56, which is slightly less than 90° and is adapted to the inclination of the side wall 34 of the articulated part 12. This end cap 28 shall be assigned to a wiper arm 10 whose articulated part 12 features a roof-like cross-sectional profile having side walls 34 of different inclinations. The inclination of the guide surfaces 44 is adapted to the steeper side wall 34 and the guide ribs 42 are adjacent to this side wall 34 in an assembled position. In the wiper arm's 10 parking position, the flatter side wall 34 points downward and acts as a spoiler during the wiping operation.

Figure 3:
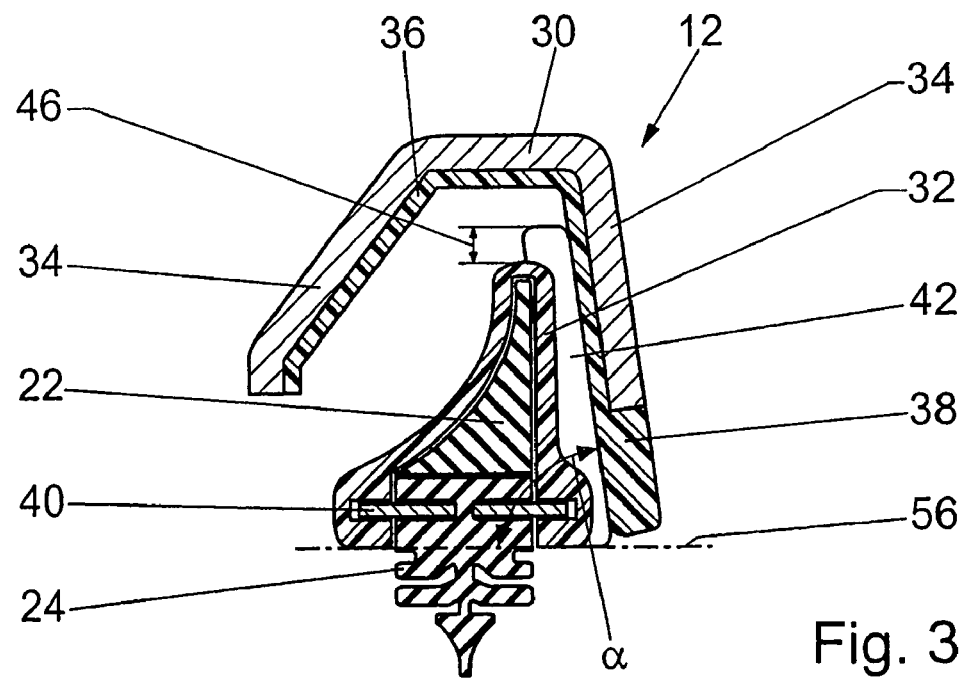
FIG. 3 A variation of FIG. 2.
Figure 4:
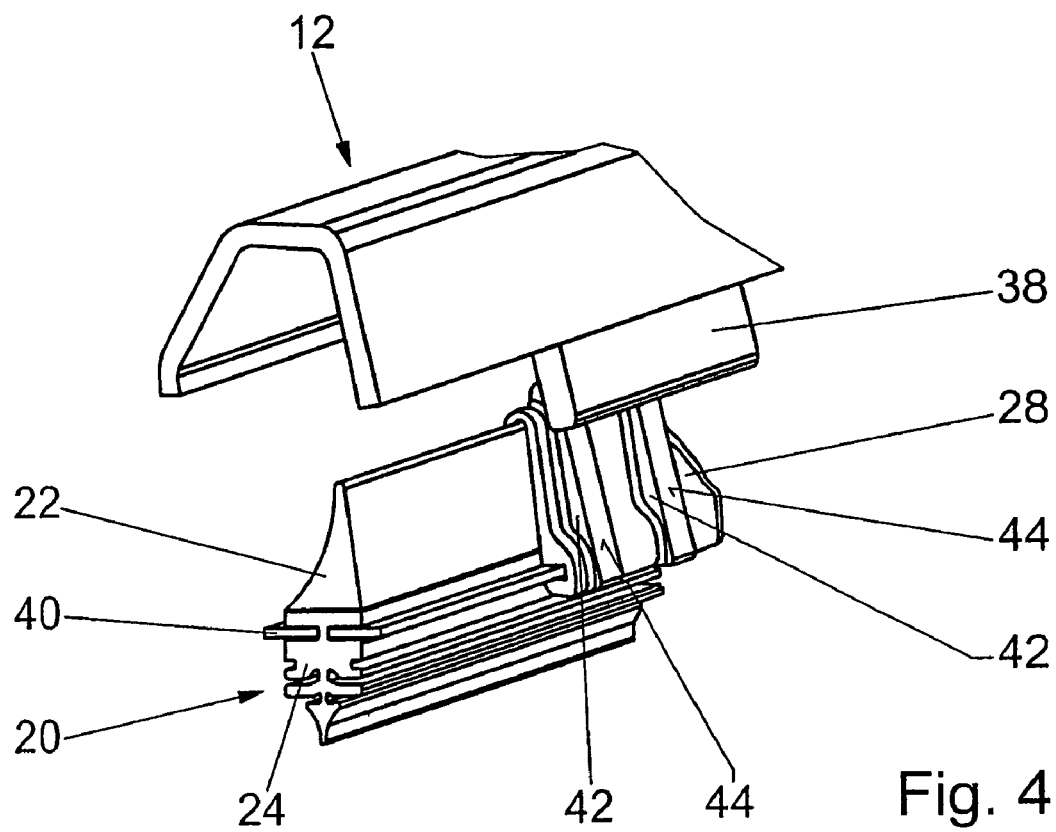
FIG. 4 A perspective partial view of FIG. 3 in a modified relative position between an articulated part and a wiper blade.
Figure 5:
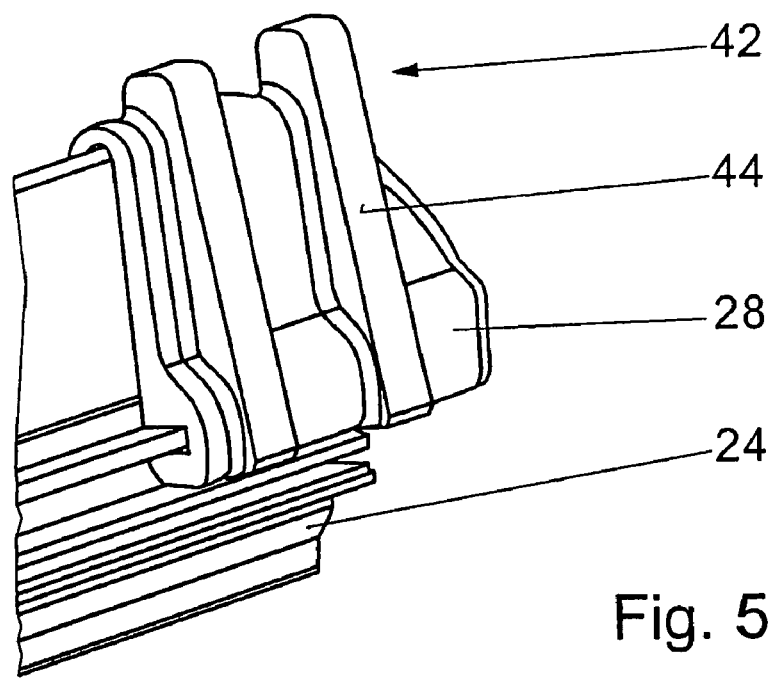
FIG. 5 An enlarged perspective depiction of an end cap in accordance with FIG. 4.
Figure 6:
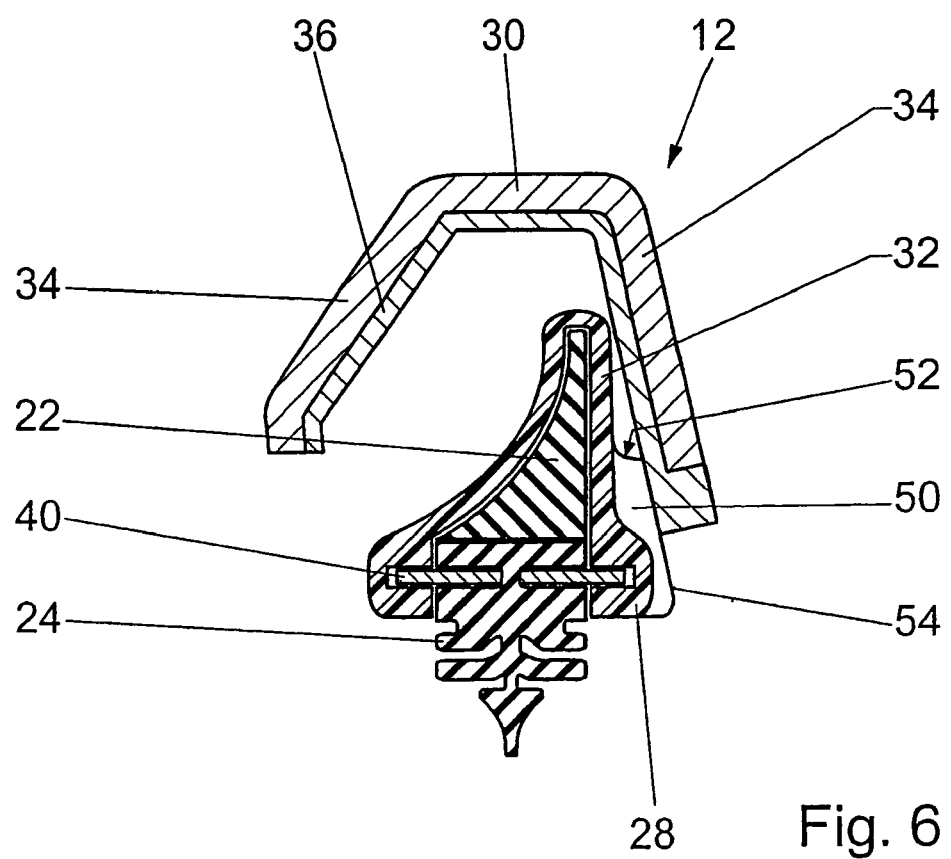
FIG. 6 Another variation in accordance with FIG. 2.

So that the guide surfaces 44 are long enough to also have constant contact with the bearing surface on the side wall 34 of the articulated part 12 even in the case of greater stroke movements, in the embodiment in accordance with FIG. 3 through FIG. 5, the guide ribs 42 project beyond the outer profile of the end cap 28 on one of the sides facing away from the base surface 56 by an area 46. Moreover, the bearing surface on the articulated part 12 is lengthened by the guide bracket 36, which projects beyond the side wall 34 by a part 38. A possible extreme position between the articulated part 12 and the wiper blade 20 is depicted in FIG. 4.

According to the invention, the guide bracket 36 is inserted into the articulated part 12, for example, clipped in, clamped or glued. As a result, the articulated part 12 is changed in a simple manner and only in the area of the dipping end cap 28, and otherwise corresponds to the standard design. As a result, a wiper arm 10 can also be subsequently equipped with this type of wiper blade guidance.

According to another embodiment (FIG. 6), the guide bracket 36 is composed of a metallic material and the guide ribs 50 are shortened as compared with the height of the end cap 28. This end cap 28 is adjacent with the guide surfaces 54 in one area and its upper part is adjacent with the guide bracket 36 in another area. A flute 52 forms the transition between the areas.

The invention claimed is:

1. Wiper blade (20) of a windshield wiper having a longitudinal direction, the wiper blade (20) comprising:
   a wiper strip support (22) having an end;
   a wiper strip (24) having an end; and at least one end cap (28) on the end of the wiper support (22) and the end of the wiper strip (24), the end cap (28) having an inner cross-sectional profile adapted to the cross-sectional profile of the wiper strip support (22), the end cap (28) having a lateral surface and a guide rib (42, 48, 50) projecting laterally from the lateral surface and running transverse to the longitudinal direction (52) of the wiper blade (20), the guide rib (42, 48, 50) and having a guide surface (44, 54) formed laterally on the guide rib (42, 48, 50).

2. Wiper blade (20) according to claim 1, wherein the wiper strip support (22) has an opposite end, wherein the wiper strip (24) has an opposite end, and wherein the wiper blade (20) further comprises a second end cap (28) on the opposite end of the wiper strip support (22) and on the opposite end of the wiper strip (24).

3. Wiper blade (20) according to claim 1, wherein the wiper blade (20) is assembled with a wiper arm (10), which has a U-shaped cross-sectional profile into which the end cap (28) is guided in an assembled position by guide ribs (48) on both sides on side walls (34).

4. Wiper blade (20) according to claim 3, wherein, on the side that faces away from a base surface (56), the guide rib (42, 48) projects beyond an outer profile of the end cap (28) by an area (46).

5. Wiper blade (20) according to claim 3, wherein a guide bracket (36) made of plastic, which serves as a bearing surface for the guide surface (44, 54), is inserted into the wiper arm (10).

6. Wiper blade (20) according to claim 1, wherein the wiper blade (20) is assembled with a wiper arm (10), which has a roof-shaped cross-sectional profile with a steeper side wall (34), whereby the guide surface (44, 54) on the guide rib (42, 50) formed on one side is guided only on the steeper side wall (34) in an assembled position and the inclination of the guide surface (44, 54) is adapted to the inclination of the side wall (34).

7. Wiper blade (20) according to claim 6, wherein the guide surface (44, 54) has an angle of inclination to a base surface (56), which is slightly less than 90°.

8. Wiper blade (20) according to claim 7, wherein, on the side that faces away from the base surface (56), the guide rib (42, 48) projects beyond an outer profile of the end cap (28) by an area (46).

9. Wiper blade (20) according to claim 7, wherein the guide rib (50) is shortened as compared with a height of the end cap (28) so that an upper part of the end cap (28) touches an inner contour of the wiper arm (10).

10. Wiper blade (20) according to claim 7, wherein a guide bracket (36) made of plastic, which serves as a bearing surface for the guide surface (44, 54), is inserted into the wiper arm (10).

11. Wiper blade (20) according to claim 6, wherein the guide rib (50) is shortened as compared with a height of the end cap (28) so that an upper part of the end cap (28) touches an inner contour of the wiper arm (10).

12. Wiper blade (20) according to claim 11, wherein a guide bracket (36) made of plastic, which serves as a bearing surface for the guide surface (44, 54), is inserted into the wiper arm (10).

13. Wiper blade (20) according to claim 6, wherein a guide bracket (36) made of plastic, which serves as a bearing surface for the guide surface (44, 54), is inserted into the wiper arm (10).

14. Wiper blade (20) according to claim 6, wherein, on the side that faces away from a base surface (56), the guide rib (42, 48) projects beyond an outer profile of the end cap (28) by an area (46).

15. Wiper blade (20) according to claim 1, wherein, on the side that faces away from a base surface (56), the guide rib (42, 48) projects beyond an outer profile of the end cap (28) by an area (46).

16. Wiper blade (20) according to claim 15, wherein the wiper blade (20) is assembled with a wiper arm (10), and wherein a guide bracket (36) made of plastic, which serves as a bearing surface for the guide surface (44, 54), is inserted into the wiper arm (10).

17. Wiper blade (20) according to claim 1, wherein the wiper arm (20) is assembled with a wiper arm (10), and wherein a guide bracket (36) made of plastic, which serves as a bearing surface for the guide surface (44, 54), is inserted into the wiper arm (10).

18. Wiper blade (20) according to claim 17, wherein the guide bracket (36) lengthens, in cross-section, a side wall (34) of the wiper arm (10) facing the guide surface (44, 54).

19. Wiper assembly comprising:
    a wiper arm (10) including a part (12) having a wall (34) with an inner surface; and
    a wiper blade (20) having a longitudinal direction, the wiper blade (20) including
        a wiper strip support (22) having an end,
        a wiper strip (24) having an end, and
        at least one end cap (28) on the end of the wiper support (22) and the end of the wiper strip (24), the end cap (28) having an inner cross-sectional profile adapted to the cross-sectional profile of the wiper strip support (22), the end cap (28) having a lateral surface and a guide rib (42, 48, 50) projecting laterally from the lateral surface and running transverse to the longitudinal direction (52) of the wiper blade (20), the guide rib having a lateral guide surface (44, 54) formed laterally on the guide rib, the lateral guide surface (44, 54) being engageable with the inner surface of the wall (34) of the part (12).

20. Wiper assembly according to claim 19, wherein the wiper strip support (22) has an opposite end, wherein the wiper strip (24) has an opposite end, and wherein the wiper blade (20) further includes a second end cap (28) on the opposite end of the wiper strip support (22) and on the opposite end of the wiper strip (24).

* * * * *